N. WALLACE.
TRAP.
APPLICATION FILED APR. 26, 1915.

1,216,894.

Patented Feb. 20, 1917
2 SHEETS—SHEET 1.

Inventor
N. Wallace
By Victor J. Evans
Attorney

Witnesses

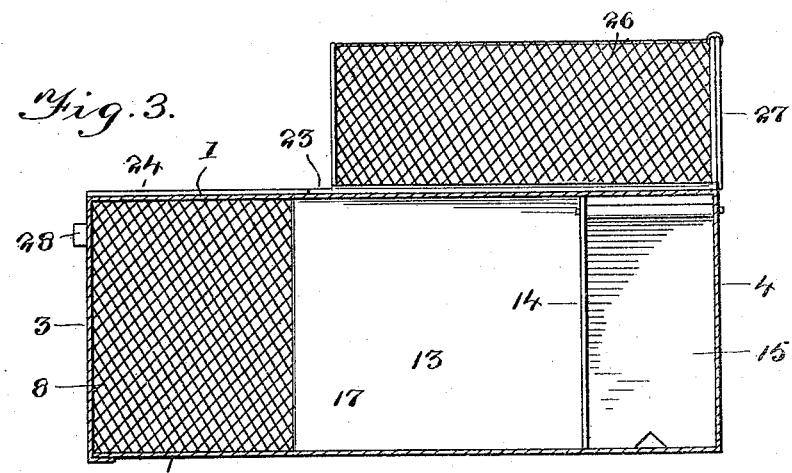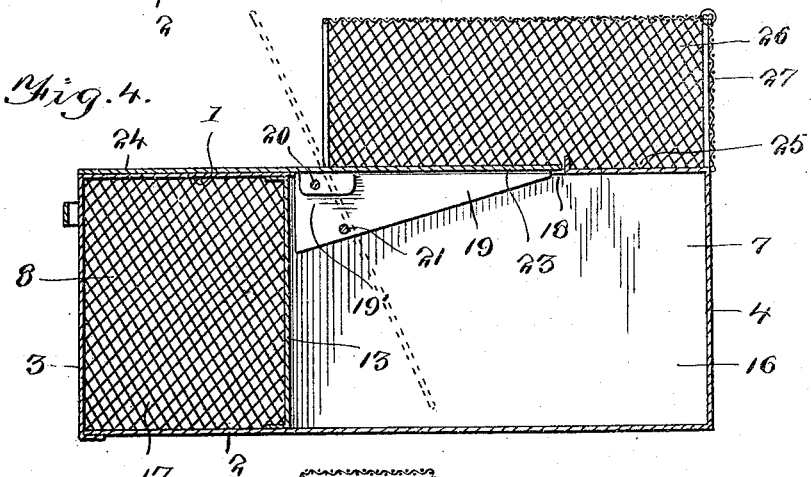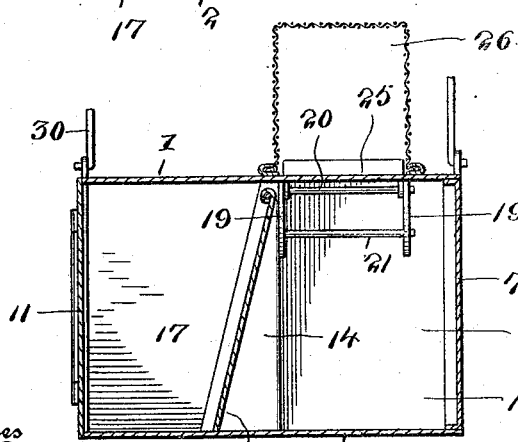

UNITED STATES PATENT OFFICE.

NICK WALLACE, OF MAGNOLIA, MINNESOTA.

TRAP.

1,216,894.  Specification of Letters Patent.  Patented Feb. 20, 1917.

Application filed April 26, 1915. Serial No. 23,949.

*To all whom it may concern:*

Be it known that I, NICK WALLACE, a citizen of the United States, residing at Magnolia, in the county of Rock and State of Minnesota, have invented new and useful Improvements in Traps, of which the following is a specification.

This invention relates to traps and more particularly to that type of rodent traps which are known in the art as self-set, everset traps.

The principal object of the invention is to provide a simple and efficient trap of this character having an automatically set trap door actuated by the animal in endeavoring to reach the bait.

Another object of the invention is to provide a trap of this character in which the trap door is automatically restored to normal position and is so arranged with relation to the bait pan that it is impossible for the animal to reach the bait before being projected into the receiving compartment.

Further objects of the invention will appear as the following description is read in connection with the accompanying drawing, which forms a part of this application, and in which:—

Fig. 3 is a longitudinal section on the line 3—3 of Fig. 2.

Fig. 4 is a similar section on the line 4—4 of Fig. 2.

Fig. 5 is a transverse section on the line 5—5 of Fig. 2.

Figure 1:
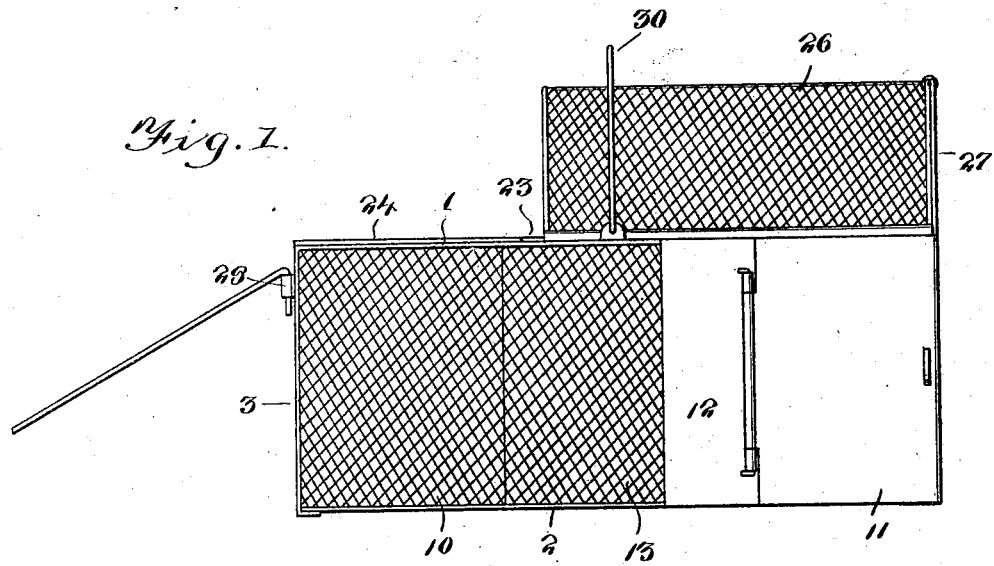
Figure 1 is a side elevation.
Figure 2:
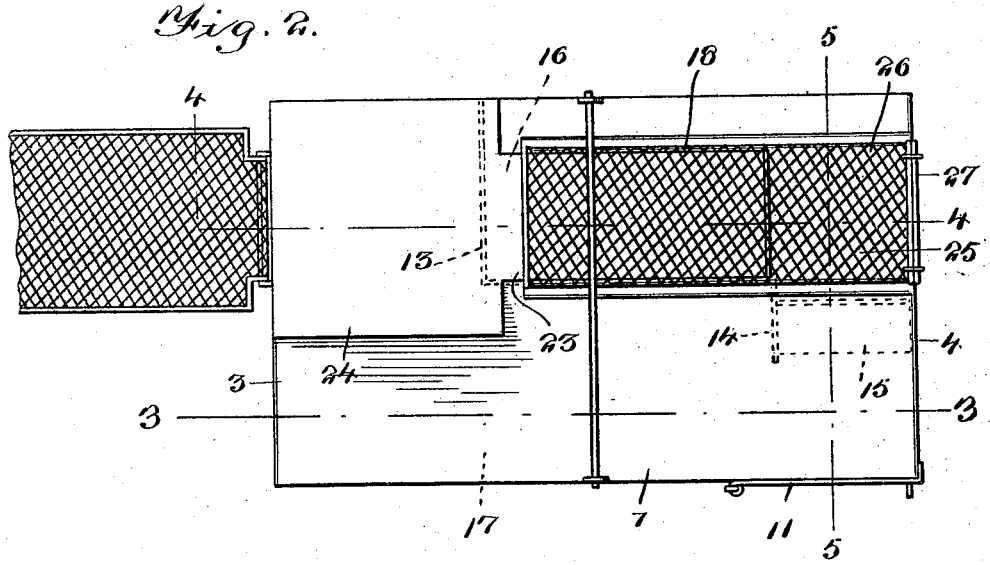
Fig. 2 is a top plan view.

In the specific embodiment of the invention as illustrated herein, the top 1, bottom 2 and both ends 3 and 4 of the trap are formed from a single sheet of metal, the ends of which are joined together at one corner of the device by soldering. One side of the trap indicated at 6 is constructed of a sheet of metal 7 and a piece of wire fabric 8 while the opposite side 9 is constructed of a piece of fabric 10 which extends over one-half of the length of the trap, the remaining portion of the side being closed by a door 11 hinged to a cross strap 12. Secured between the top 1 and bottom 2 is a right angular partition 13 having one end thereof secured to the forward edge of the side piece 7 and its opposite end terminating short of the rear end 4 in a right angular flange 14 which with the end 4 defines a door-way or opening normally closed by a gravitating door 15. The partition 13 separates the trap into receiving and cage compartments 16 and 17, respectively, the latter of which is closed by the door 11.

Immediately above the receiving compartment the top 1 is cut away to form an entrance opening 18, the metal displaced by forming said opening by converging slits and a transverse slit intersecting the same at each end thereof being bent downwardly into guiding flanges 19 which taper from the rear toward the forward end of the trap and the right angular end of the partition 13 where they form bearing ears 19 in which is mounted a shaft 20 and a limiting rod 21. Pivotally mounted upon the shaft 20 is a door 23 whose rear end is arranged to close the opening 18 and whose forward end is widened to produce a weighted platform 24, as shown. Immediately in the rear of the door opening 18 the top is bent upwardly into the form of a retaining flange which prevents the bait which is placed upon the top at 25 from being pulled into the opening in the animal's endeavor to prevent being projected into the receiving compartment. The bait platform 25 and the opening 18 are covered by a U-shaped guard 26 having a door 27 hinged to one end which may be raised for inserting the bait upon the platform 25 and locked in closed position in any suitable manner. The sides of this guard extend vertically in a plane with the side of the opening 18 so that it is absolutely necessary for the animal attempting to get the bait to walk across the forward end of the door 23, as will be readily understood. His weight thus overbalances the weight of the end 24 which normally rests upon the top of the cage and prevents the rear end of the door from passing above the retaining flange so that the animal is projected into the receiving compartment 16 from which he will proceed into the cage compartment 17 through the door 15. In order to make it easy for the rats and mice to get up onto the platform 24 I preferably secure to the end 3 a bracket 28 upon which one end of an inclined way 29 is supported. The trap is carried around by a bail-shaped handle 30.

In the use of a trap of this character a rat or mouse seeking the bait on the platform 25 has his weight well supported until the majority or heavier portion of his body passes the pivotal point of the door 23. The rear end of the door which fits the opening 18 will then tilt downwardly and project the rat or mouse into the compartment 16.

What is claimed is:—

In a device of the kind described, in combination a sheet metal box having a top wall, said top wall being cut away between its ends to provide a slot forming a passage for a platform, the longitudinal edges of the slot being bent down in parallel relation within said box to provide flanges, a flat sheet shaped to provide a cover for said slot and consisting of a front portion and a rear portion longer and narrower than the front portion, the front portion of the cover being heavier than the rear portion and normally contacting with said top wall to cause the rear portion thereof to close said slot, a rod connecting said parallel flanges at one end, a pair of lugs carried by said platform in back of its front portion, said lugs being fulcrumed upon said rod, so that the rear portion of said platform may swing in said slot, and a second rod connected to said flanges below and in advance of the first rod against which the platform rests when in tilted position.

In testimony whereof I affix my signature in presence of two witnesses.

NICK WALLACE.

Witnesses:
L. A. LOHR,
F. B. PETTENGILL.

Copies of this patent may be obtained for five cents each, by addressing the "Commissioner of Patents, Washington, D. C."